United States Patent
Radu et al.

(10) Patent No.: US 7,264,291 B2
(45) Date of Patent: Sep. 4, 2007

(54) ASSEMBLY FOR SUPPORTING AN ARTICLE IN A VEHICLE

(75) Inventors: Bogdan Radu, Dearborn, MI (US); Alan G. Dry, Grosse Point Woods, MI (US)

(73) Assignee: Lear Corporation, Southfield, MI (US)

(*) Notice: Subject to any disclaimer, the term of this patent is extended or adjusted under 35 U.S.C. 154(b) by 72 days.

(21) Appl. No.: 10/952,494

(22) Filed: Sep. 28, 2004
(Under 37 CFR 1.47)

(65) Prior Publication Data
US 2006/0066118 A1    Mar. 30, 2006

(51) Int. Cl.
*B60P 27/00* (2006.01)
(52) U.S. Cl. .................. 296/24.34; 296/37.8
(58) Field of Classification Search .......... 296/37.1, 296/37.5, 37.8, 1.09, 24.3, 24.33, 24.34, 296/24.4, 24.1; 220/326, 844; 224/282; 297/115; 312/325
See application file for complete search history.

(56) References Cited

U.S. PATENT DOCUMENTS

| | | | |
|---|---|---|---|
| 4,052,103 A | 10/1977 | Steinthal | |
| 4,674,790 A | 6/1987 | Johnson | |
| 4,878,438 A | 11/1989 | Carver | |
| 4,984,847 A | 1/1991 | Bedu et al. | |
| 5,248,183 A | 9/1993 | Gignac et al. | |
| 5,390,976 A * | 2/1995 | Doughty et al. | 297/115 |
| 5,749,629 A | 5/1998 | Heath et al. | |
| 5,788,324 A | 8/1998 | Shea et al. | |
| 5,845,965 A | 12/1998 | Heath et al. | |
| 5,947,554 A | 9/1999 | Mashkevich | |
| 6,203,088 B1 | 3/2001 | Fernandez et al. | |
| 6,283,551 B1 | 9/2001 | Bergin | |
| 6,719,367 B2 | 4/2004 | Mic et al. | |
| 6,739,669 B2 | 5/2004 | Etzioni et al. | |
| 2001/0028207 A1 | 10/2001 | Hoshi | |
| 2003/0155787 A1* | 8/2003 | Lein et al. | 296/24.1 |
| 2003/0184133 A1 | 10/2003 | Mie et al. | |
| 2003/0218373 A1 | 11/2003 | Etzioni et al. | |
| 2004/0094587 A1 | 5/2004 | Harden et al. | |
| 2005/0230993 A1* | 10/2005 | Dry | 296/37.8 |

FOREIGN PATENT DOCUMENTS

| | | |
|---|---|---|
| DE | 84 18 140 U | 9/1984 |
| DE | 43 44 372 | 6/1995 |
| DE | 195 08 987 | 4/1996 |
| DE | 195 33 374 | 3/1997 |
| DE | 100 32 657 | 1/2002 |
| DE | 100 63 190 | 6/2002 |
| GB | 2 393 945 | 4/2004 |
| WO | 03/080450 | 10/2003 |
| WO | 2004/022386 | 3/2004 |

* cited by examiner

*Primary Examiner*—Lori L. Lyjak
(74) *Attorney, Agent, or Firm*—MacMillan, Sobanski & Todd, LLC

(57) ABSTRACT

An assembly for supporting an article in a vehicle includes a vehicle component. A support housing is pivotably connected to the component for movement between an adjacent position and an extended position. The assembly further includes a support member for laterally supporting an article. The support member is moveable relative to the support housing.

20 Claims, 4 Drawing Sheets

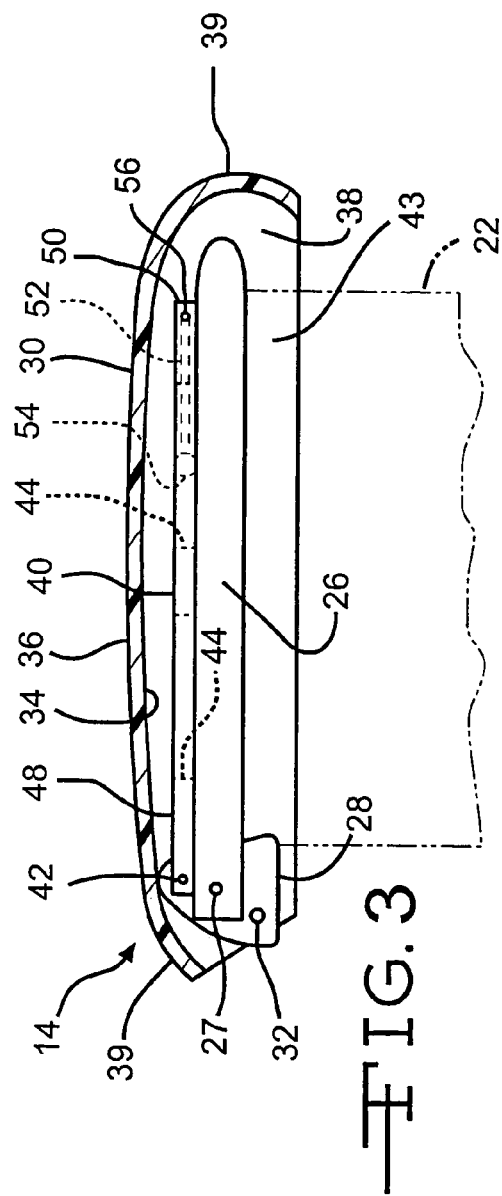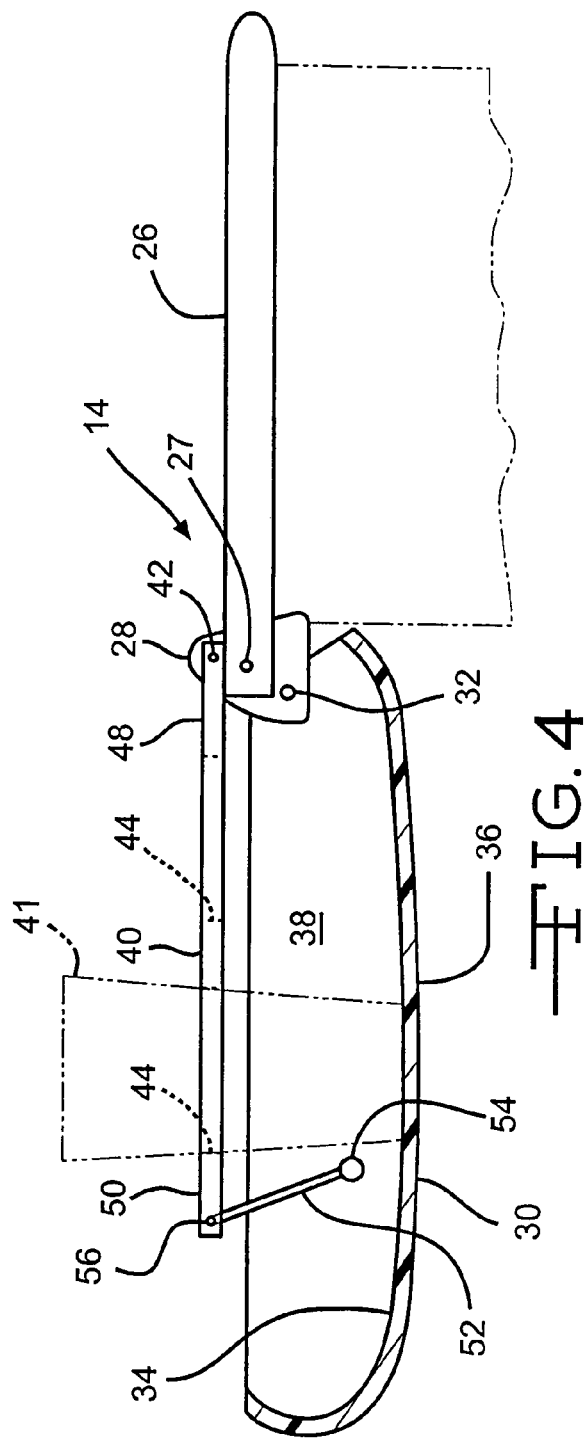

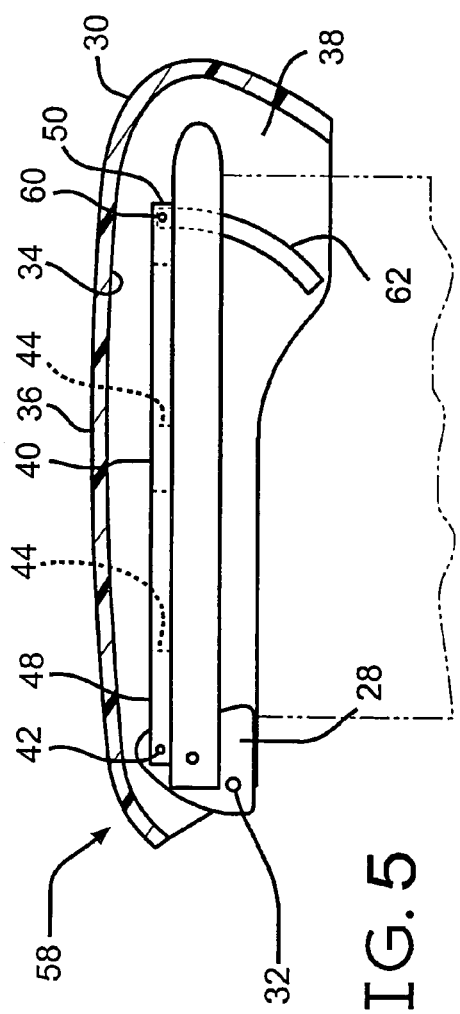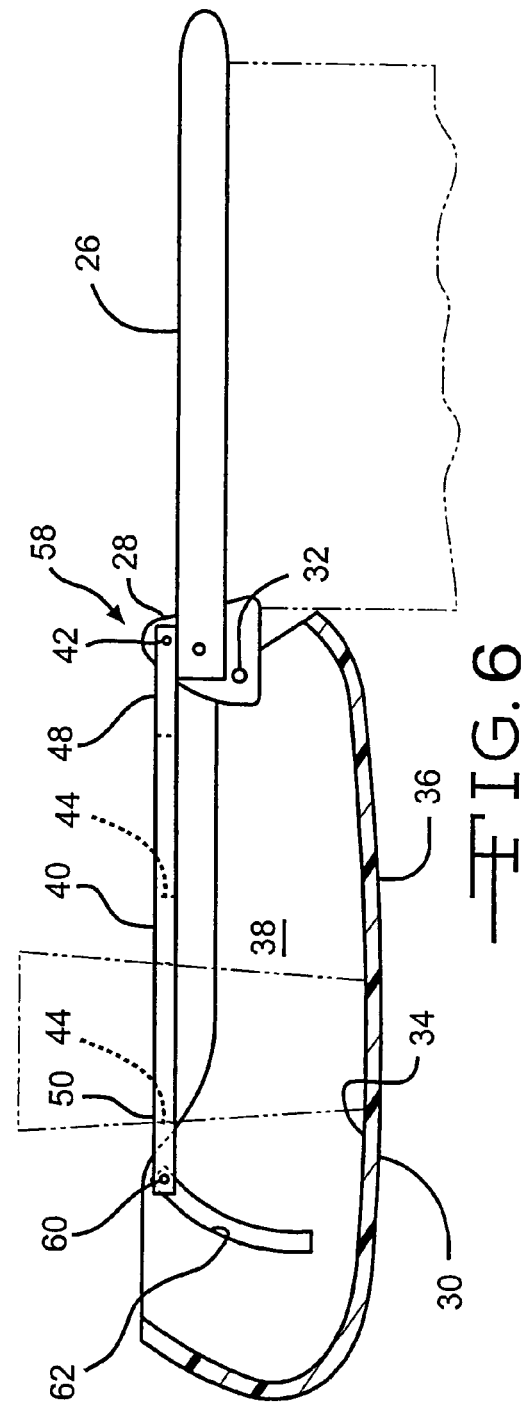

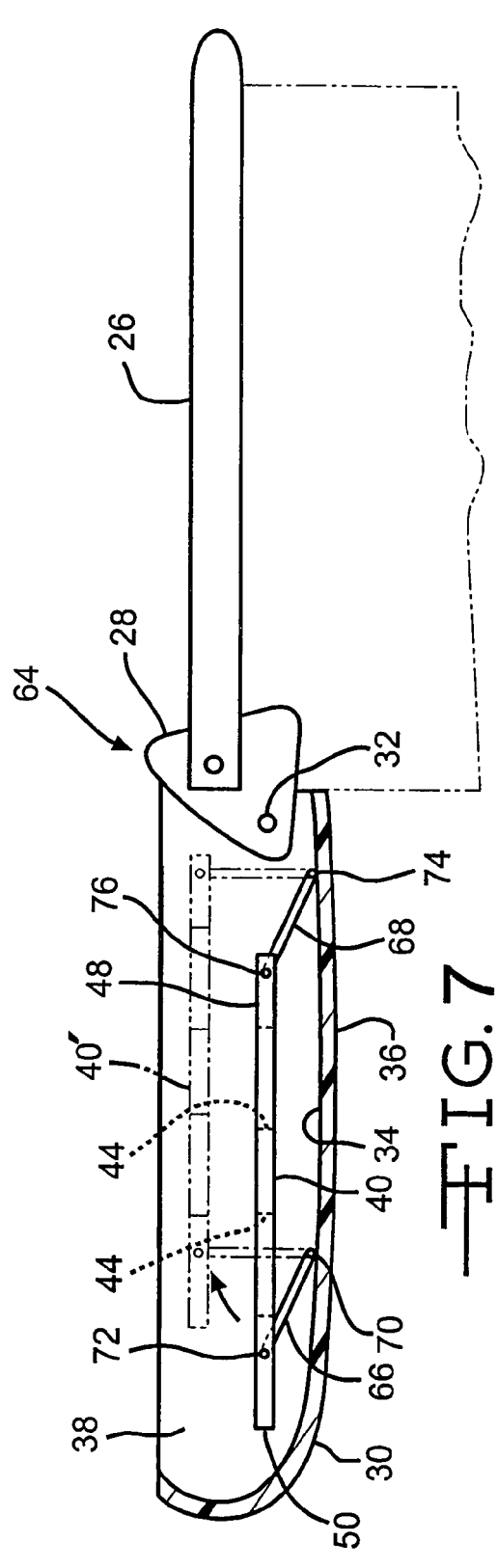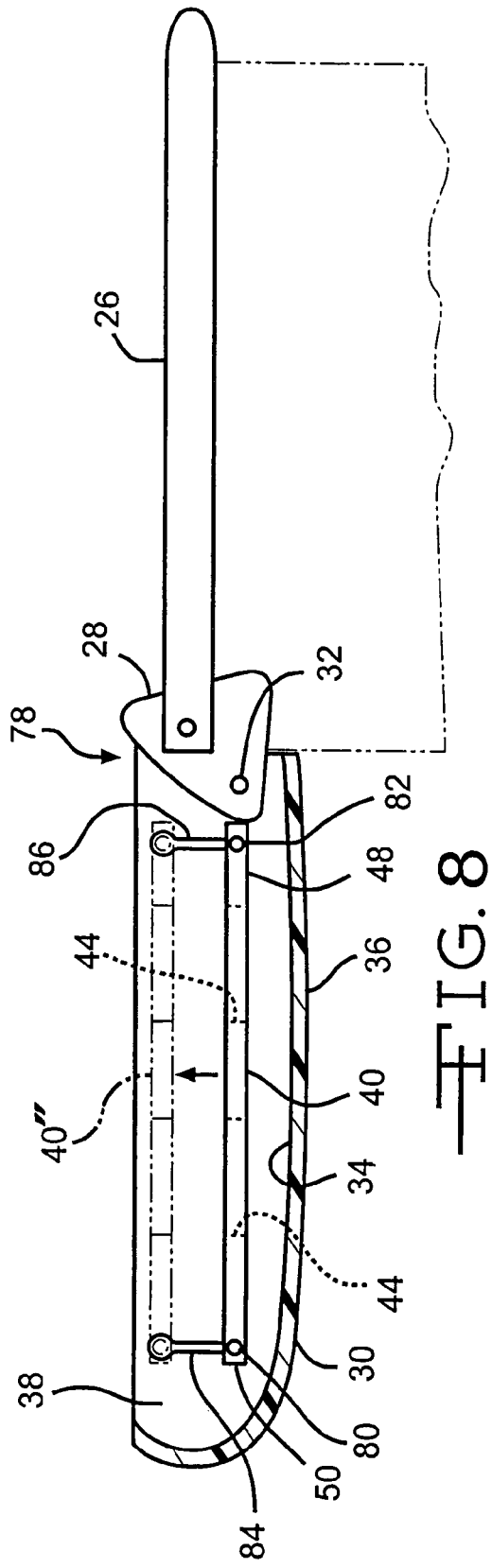

ASSEMBLY FOR SUPPORTING AN ARTICLE IN A VEHICLE

BACKGROUND OF THE INVENTION

This invention relates to an assembly for supporting an article. More particularly, the invention relates to an assembly for supporting an article, such as a beverage container or mobile phone, in a vehicle.

Vehicle interiors typically include a variety of decorative and functional trim panels. For example, the front area of the interior of a vehicle includes an instrument panel, typically formed of a molded plastic material. Vehicles also may include a center console located between the driver and passenger seats for storage and placement of various articles. The instrument panel and/or center console can include a variety of devices for supporting articles, for example for holding beverage containers. Such devices are typically known as cup holders. It is often desirable for vehicle occupants to store other articles or objects in a vehicle such that the articles are within easy reach of the occupant. There are known devices for supporting articles that are suitable to be used as cup holders and that are typically adapted to hold known beverage containers of varying sizes, such as cans, cups, and bottles, and may be capable of holding other articles, such as mobile telephones. However, such devices often interfere with other interior vehicle components or are obtrusive within the vehicle interior.

BRIEF SUMMARY OF THE INVENTION

This invention relates to an assembly for supporting an article in a vehicle. The assembly for supporting an article in a vehicle includes a vehicle component. A support housing is pivotably connected to the component for movement between an adjacent position and an extended position. The assembly further includes a support member for laterally supporting an article. The support member is moveable relative to the support housing.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a partial cross-sectional view of the assembly taken along the line 3-3 of FIG. 2 with the support housing being in an adjacent position as indicated by the broken lines in FIG. 2.

FIG. 4 is a partial cross-sectional view of the assembly of FIG. 1 similar to FIG. 3 with the support housing in the extended position.

FIG. 5 is a cross-sectional view of an assembly for supporting an article in a vehicle according to a second embodiment of the present invention with the support housing shown in an adjacent position.

FIG. 6 is a view of the assembly similar to FIG. 5 with the support housing in an extended position.

FIG. 7 is a cross-sectional view of an assembly for supporting an article in a vehicle according to a third embodiment of the present invention with a support housing in an extended position and with a support member shown in a position generally adjacent to the interior housing surface of the support housing.

FIG. 8 is a cross-sectional view of an assembly for supporting an article in a vehicle according to a fourth embodiment of the present invention with a support housing in an extended position and with a support member shown in a position generally adjacent to the interior housing surface of the support housing.

DETAILED DESCRIPTION OF THE PREFERRED EMBODIMENT

Figure 1:
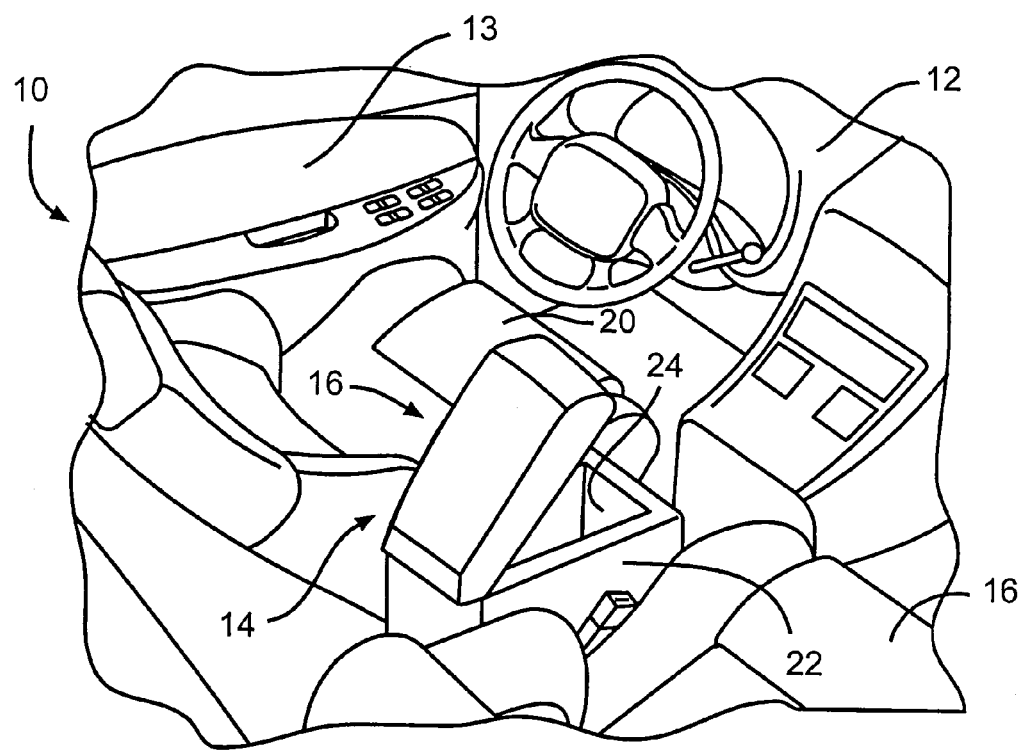
FIG. 1 is a perspective view of an assembly, in accordance with the present invention, for supporting an article in a vehicle, shown installed in a vehicle interior.

In the following description of the invention, certain terminology will be used for the purpose of reference only, and are not intended to be limiting. Terms such as "upper", "lower", "above", "below", "rightward", "leftward", "clockwise", and "counterclockwise" refer to directions in the drawings to which reference is made. Terms such as "inward" and "outward" refer to directions toward and away from, respectively, the geometric center of the component described. Terms such as "front", "rear", "side", "leftside", "rightside", "top", "bottom", "horizontal", and "vertical" describe the orientation of portions of the component within a consistent but arbitrary frame of reference which is made clear by reference to the text and the associated drawings describing the component under discussion. Such terminology will include the words specifically mentioned above, derivatives thereof, and words of similar import.

Referring now to the drawings, there is illustrated in FIG. 1 a portion of an interior passenger compartment of a vehicle, indicated generally at 10. The illustrated vehicle interior passenger compartment 10 is, in large measure, conventional in the art and is intended merely to illustrate one environment in which this invention may be used. Thus, the scope of this invention is not intended to be limited for use with the specific structure of the vehicle interior passenger compartment 10 illustrated in FIG. 1 or with vehicle interior passenger compartments in general. On the contrary, as will become apparent below, this invention may be used in any desired environment for the purposes described below.

As shown in FIG. 1, the vehicle interior passenger compartment 10 includes a dashboard or instrument panel 12. Positioned within the instrument panel 12 are various visual gauges for the driver's convenience, and various temperature and climate controls. Other controls, storage compartments and stereo controls may be positioned within other interior vehicle components within vehicle interior passenger compartment 10. The vehicle interior passenger compartment 10 may be partially defined by vehicle doors 13 (one shown)

Figure 2:
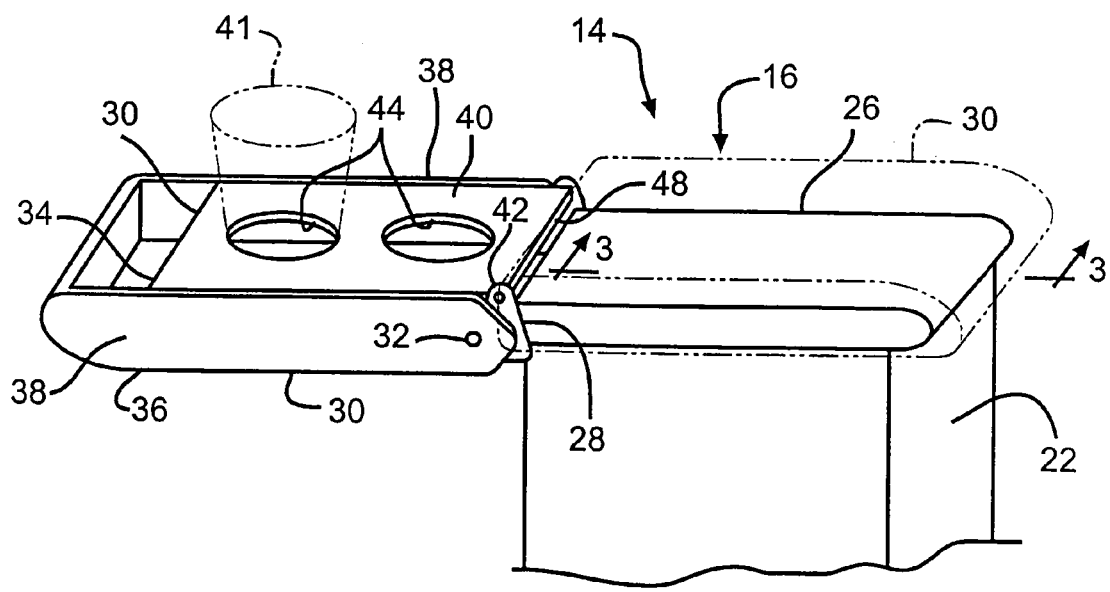
FIG. 2 is a perspective view of the assembly of FIG. 1 shown with the support housing in an extended position.

An assembly 14 for supporting an article within a vehicle is positioned within the vehicle interior passenger compartment 10. The assembly 14 preferably includes a center console arrangement 16. The center console arrangement 16 is positioned between a passenger seat 18 and a driver seat 20. The center console arrangement 16 preferably includes a center console cabinet 22 that preferably defines a storage compartment 24. It must be understood however that the center console cabinet 22 need not define an interior storage compartment 24. The center console arrangement 16 also preferably includes an armrest 26 (as shown in FIG. 2) that can also serve as a lid. The storage compartment 24 can be accessed by lifting the armrest lid 26, as will be described below. It will be appreciated that the center console arrangement 16 may extend into the back seat area (not shown) of the vehicle interior passenger compartment 10 and in fact the assembly 14, according to one embodiment of the invention, shown in FIGS. 1-4 are ideally useful for passengers in rear seats (not shown) located behind the center console arrangement 16.

Alternatively, a second console arrangement (not shown) including an assembly according to another embodiment of the present invention may be provided in the back seat area (not shown). Further, an assembly according to yet another embodiment of the present invention may be included with an overhead console (not shown) that can also be accessible from within the interior passenger compartment 10 of the vehicle. The overhead console may contain various controls, such as a garage door opener, climate controls, etc. The overhead console may also contain storage compartments for sunglasses, portable media, or a mobile phone.

As best seen in FIG. 2, the center console arrangement 16 preferably includes a pair of brackets 28 (one shown) mounted on the center console cabinet 22. The armrest 26 is preferably pivotably mounted (as indicated at 27 in FIGS. 3 and 4) to the center console cabinet 22 via the brackets 28 for movement between an open and a closed position and thus also suitable as a lid to the storage compartment 24. It must be understood however that the armrest 26 need not moveably mounted. Alternatively, a lid (not shown) that is not suitable to be an armrest may be mounted to the center console cabinet 22 via the brackets 28, if desired. Further, it must be understood that the center console arrangement 16 need not include the armrest 26 or a lid at all.

The assembly 14 for supporting an article within a vehicle also includes a support housing 30. The support housing 30 is preferably pivotably mounted to the center console cabinet 22, such as via the brackets 28. However, the support housing 30 may be mounted to the center console arrangement 16 in any suitable manner. Preferably the support housing 30 is mounted to the brackets 28 by a pair of housing hinge pins 32 (one shown). The support housing 30 defines an interior housing surface 34 and an exterior housing surface 36. The support housing 30 is pivotably mounted for movement between an extended position, as shown in FIG. 4, and an adjacent position, as shown in FIG. 3. In the extended position, the interior surface 34 in generally suitable to provide vertical support to an article in contact with the interior surface 34, as will be described below. In the adjacent position, the interior surface 34 generally faces downward towards the console arrangement 16, as will be discussed below.

The support housing 30 can have any suitable contoured shape, and is preferably shaped to function as an armrest when in the adjacent position. The support housing 30 can be made of any suitable material, such as metal or plastic, and preferably has an outer aesthetically pleasing cover layer, such as cloth fabric, leather, and/or foam padding. In the embodiment shown, the support housing 30 includes a pair of opposed sides 38 and curved end portions 39, which cooperate with the interior surface 34 to define a cavity 43.

The assembly 14 further includes a support member 40 moveably mounted relative to the support housing 30. The support member 40 is preferably pivotably connected to the center console arrangement 16 via the brackets 28. As will be described below, the support member 40 generally provides lateral support for an article, such as a beverage container or cup, indicated by broken lines 41. While the support member 40 is shown as a single support member, it must be appreciated that the support member 40 may be a single member or multiple members, and may be any desired size or shape to provide support to an article placed within the assembly 14, as will be described below. In the embodiment shown, the support member 40 has a generally flat planar shape. Preferably the support member 40 is mounted to the brackets 28 by a pair of support member hinge pins 42 (one shown). The support member 40 preferably includes a pair of slots 44, although, it must be understood that the support member 40 may include any suitable number of slots or no slots at all, as will be discussed below. The slots 44 are suitable to provide the lateral support for the cup 41, or any other suitable article, within one of the slots 44. Preferably, the slots 44 are generally circular shaped and suitable to receive the cup 41 or other beverage container. The support member 40 has a first end 48 and a second end 50.

As best seen in FIGS. 3 and 4, a pair of support members or bars 52 (one shown) is each pivotably connected at a first end 54 to a respective side 38 of the support housing 30 and at a second end 56 to the second end 50 of the support member 40. Although the assembly 14 is described as including a pair of support bars 52, it must be understood that the assembly 14 may include a single support bar 52 or any suitable number of support bars 52.

The operation of the assembly 14 will now be described. When the support housing 30 is in the adjacent position, as shown in FIG. 3, the exterior housing surface 36 can function as an armrest or a horizontal support surface. The interior housing surface 34 generally faces downward toward the armrest 26 of the center console arrangement 16. The support member 40 is disposed between the support housing 30 and the armrest 26 of the center console arrangement 16. Preferably the support member 40 is generally flush with the armrest 26 and generally parallel with the interior housing surface 34 to minimize the packing constraints for the assembly 14. The first end 54 of the support bar 52 is preferably pivotably connected to the side 38 of the support housing 30 at a position closer to the support member hinge pin 42 than the position of the second end 50 of the support member 40 to the support member hinge pin 42. This arrangement facilitates the movement of the support member 40 relative to the support housing 30. It must be understood, however, that the support bar 52, the support housing 30, and the support member 40 may be in any suitable arrangement.

When the user wishes to use the article holding capabilities of the assembly 14, the support housing 30 is manually moved to the extended position, as shown in FIG. 4. It must be understood, however, that the support housing 30 may be moved automatically by any suitable device (not shown), such as servo or hydraulic mechanisms. When the support housing 30 is moved to the extended position, rotated counter-clockwise as shown in FIGS. 3 and 4, the support bar 52 automatically deploys the support member 40 to a position spaced apart from the interior housing surface 34. Similarly, when the support housing 30 is moved back to the adjacent position the support member 40 is automatically deployed to the position of FIG. 3 as described above. The support member 40, the support housing 30, the support bar 52, and the bracket 28 function as a four bar mechanism. It must be understood that the pivot points of the respective members, and the dimensions thereof, may be altered to change the space relationship between the support member 40 and the support housing 30.

When the support housing is in the extended position, the interior support surface 34 is suitable to provide vertical support to an article in contact with the interior support surface 34. The edges of the slots 44 of the support member are suitable to provide lateral support to an article in contact with one of the slots 44. Thus the assembly 14 may support an article, such as the cup 41, via the interior support surface 34, the slots 44, or both in combination. By varying the shape and design of the interior surface 34 and/or the slots 44, the assembly 14 may be used to receive a variety of articles. For example, the article may be any object that is desired to be restrained within the passenger compartment of the vehicle. In the preferred embodiment, the article is a beverage container, such as the cup 41, as shown in broken lines in FIGS. 2 and 4, and described above. It is anticipated that the article may have a generally cylindrical shape (e.g. soda can) or a generally tapered cylindrical shape (e.g. fountain drink or coffee container). However, the article may be any removable item such as a mobile phone, PDA, sunglasses, cigarette box, or portable media, and have any shape. Also, a larger version of the assembly 14 can also be implemented in accordance with this invention such that a notebook computer or other larger object can be supported therewith. It will also be appreciated that the article may be a liquid or beverage disposed directly within the assembly 14.

Further, it must be appreciated that, although the assembly 14 has been described as including a center console arrangement 16, it must be understood, however, that the assembly 14 need not be included into the center console arrangement 16, as described, but rather may be included in any suitable interior vehicle component, such as a rear center console, an overhead console, an instrument panel, or any other suitable interior vehicle component. Thus, for example, in the case of the instrument panel, when the support housing is in the adjacent position, the interior surface would generally be facing the instrument panel, or dashboard surface. Further it must be understood that the support housing may be formed to any suitable shape. For example, in the case of the instrument panel, the exterior housing surface may be formed to mimic the instrument panel, or dashboard surface. Additionally, it must be understood that the assembly may be positioned within any suitable portion of vehicle interior passenger compartment 10. For example, the assembly 14 may be provided within at least one of the instrument panel 12, the center console cabinet 22, a portion of the driver seat 20, a portion of the passenger seat 18, the storage compartment 24, the lid 26, the glove box 24, a portion of the vehicle doors 26, or any other portion or several portions of the vehicle interior passenger compartment 10.

Additionally, although the assembly 14 is shown having a generally rectangular shape, it should be appreciated that the assembly 14 could be cylindrical, conical, or have any other desired shape.

Referring now to FIGS. 5 and 6, there is shown a cross-sectional view of an assembly for supporting an article in a vehicle according to a second embodiment of the present invention, indicated generally at 58, and similar components, as to FIGS. 1 through 4, are labeled with the same numbers. The assembly 58 is shown in FIG. 5 with the support housing in an adjacent position. The support member 40 includes a pair of outwardly extending nubs 60 (one shown), preferably proximate the second end 50 of the support member 40. Each side 38 includes a curved track 62 formed therein that curves away from the support member hinge pin 42 as the track approaches the interior housing surface 34. The nubs 60 cooperate with the tracks 62 such that when the support housing 30 is moved to the extended position, as shown in FIG. 6, the support member 40 is automatically deployed to a position spaced apart from the interior housing surface 34 by the sliding motion of the nubs 60 within the respective tracks 62. Similarly, when the support housing 30 is moved to the adjacent position the support member 40 is automatically deployed to the position as shown in FIG. 5.

Now referring to FIG. 7, there is shown a cross-sectional view of an assembly for supporting an article in a vehicle according to a third embodiment of the present invention, generally indicated at 64, and similar components, as to FIGS. 1 through 4, are labeled with the same numbers. The assembly 64 is shown with the support housing 30 in an extended position, and with the support member 40 shown in solid lines in a position generally adjacent to the interior housing surface 34 of the support housing 30.

The support member 40 is pivotably connected to the support housing 30 by a first pair of support bars 66 (one shown) and a second pair of support bars 68 (one shown). The first support bar 66 is pivotably connected at a first end 70 to a respective side 38 of the support housing 30, and at a second end 72 to the second end 50 of the support member 40. The second support bar 68 is similarly pivotably connected at a first end 74 to a respective side 38 of the support housing 30, and at a second end 76 to the first end 48 of the support member 40. The support member 40, the support housing 30, the first support bar 66, and the second support bar 68 form a pivoting four bar mechanism. The support member 40 is thus manually moveable between a position adjacent the interior housing surface 34, shown in FIG. 7, and a position spaced apart from the interior housing surface 34, as indicated by the broken lines 40'. Preferably, the assembly 64 includes a stop mechanism (not shown) to hold the support member 40 in the position spaced apart from the interior housing surface 34. For example, such a mechanism may be a detent track arrangement or a releasable clip arrangement or any other suitable mechanism. Alternatively, the assembly 64 may include an automatic deployment mechanism for the support member 40, such as a spring loaded mechanism, or any other suitable mechanism.

Now referring to FIG. 8, there is shown is a cross-sectional view of an assembly for supporting an article in a vehicle according to a fourth embodiment of the present invention, generally indicated at 78, and similar components, as to FIGS. 1 through 4, are labeled with the same numbers. The assembly 78 is shown with the support housing 30 in an extended position, and with the support member 40 shown in solid lines in a position generally adjacent to the interior housing surface 34 of the support housing 30.

The support member 40 includes a first pair of detents 80 (one shown) near the second end 50 of the support member 40. The support member 40 includes a second pair of detents 82 (one shown) near the second end 50 of the support member 40. For the purposes of this description "detent" shall include, but not be limited to, any device, such as a catch, dog, or spring-operated ball, for positioning and holding one mechanical part in relation to another so that the device can be released by force applied to one of the parts. Each side 38 of the support housing 30 includes first and second tracks 84 and 86. The first and second tracks 84 and 86 preferably include a larger diameter area at the ends and a smaller diameter area therebetween. The detent 80 cooperates with the track 84 and the detent 82 cooperates with the track 86 such that the support member 40 is slidably connected to the support housing 30. The first and second pair of detents 80 and 82 are held in place at the larger diameter areas of the first and second tracks 84 and 86 and may slidably travel along the smaller diameter areas of the first and second tracks 84 and 86, respectively. The support member 40 can be manually raised and lowered between a position adjacent the interior housing surface 34, shown in FIG. 8, and a position spaced apart from the interior housing surface 34, as indicated by broken lines 40".

The principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly for supporting an article in a vehicle, the assembly comprising:
   a vehicle component;
   a support housing pivotably connected to said vehicle component for movement between an adjacent position and an extended position, said support housing defining an interior housing surface; and
   a support member for laterally supporting an article, said support member moveable relative to said support housing, wherein when said support housing is in the adjacent position said support member is moveable to a position adjacent to said interior housing surface, and wherein when said support housing is in the extended position said support member is moveable to a position spaced from said interior housing surface.

2. The assembly of claim 1 wherein said support member is moveably connected to said support housing.

3. The assembly of claim 2 wherein said support member is moveably connected to said support housing by at least one support bar.

4. The assembly of claim 1 wherein when said support housing is moved to the extended position said support member is automatically deployed to a position spaced from said interior housing surface.

5. The assembly of claim 1 wherein said vehicle component includes a lid covering a storage compartment within said vehicle component and wherein said lid is substantially flat.

6. The assembly of claim 5 wherein when said support housing is in the adjacent position said support member is in a position above said lid.

7. The assembly of claim 5 wherein when said support housing is in the adjacent position said support member is in a position between said interior housing surface and said lid.

8. The assembly of claim 5 wherein when said support housing is in the adjacent position said interior housing surface is substantially parallel with said lid.

9. The assembly of claim 1 wherein said support housing defines a cavity.

10. The assembly of claim 9 wherein when said support housing is in the adjacent position said support member is in a position within said cavity.

11. The assembly of claim 1 wherein said interior housing surface is adapted to vertically support an article.

12. The assembly of claim 1 wherein said vehicle component is a vehicle console.

13. The assembly of claim 2 wherein said support member has at least one nub and wherein said support housing has at least one track and wherein said nub slidably engages said track.

14. The assembly of claim 2 wherein said support member has at least one detent and wherein said support housing has at least one track and wherein said detent slidably engages said track.

15. The assembly of claim 2 wherein said support member is moveably connected to said support housing by a four bar mechanism.

16. The assembly of claim 1 wherein said support member has at least one nub, and wherein said support housing has at least one curved track, and wherein said nub slidably engages said curved track, and wherein when said support housing is moved to the adjacent position said support member is moved to a position adjacent to said interior housing surface, and wherein when said support housing is moved to the extended position said support member is moved to a position spaced from said interior housing surface.

17. The assembly of claim 1 wherein said support member has at least one detent, and wherein said support housing has at least one track, and wherein said detent slidably engages said track, and wherein when said support housing is in the adjacent position said support member is movable to a position adjacent to said interior housing surface, and wherein when said support housing is in the extended position said support member is movable to a position spaced from said interior housing surface.

18. The assembly of claim 1 wherein said support member is moveably connected to said support housing by a four bar mechanism.

19. An assembly for supporting an article in a vehicle, the assembly comprising:
   a vehicle component;
   a support housing pivotably connected to said vehicle component for movement between an adjacent position and an extended position, said support housing defining an interior housing surface; and
   a support member for supporting an article, said support member connected to said support housing, wherein when said support housing is moved between the adjacent position and the extended position said support member is moved relative to said vehicle component, wherein said support member is one of automatically deployed to a position spaced apart from said interior housing surface when said support housing is moved between the adjacent position and the extended position and moveable to a position spaced apart from said interior housing surface when said support housing is in the extended position.

20. An assembly for supporting an article in a vehicle, the assembly comprising:
   a vehicle component;
   a support housing pivotably connected to said vehicle component for movement between an adjacent position and an extended position, said support housing defining a cavity and an interior housing surface; and
   a support member for supporting an article, said support member connected to said support housing, wherein when said support housing is in the adjacent position said support member is disposed in said cavity adjacent to said interior housing surface and when said support housing is in the extended position said support member is one of in a position spaced apart from said interior housing surface and moveable to a position spaced apart from said interior housing surface.

* * * * *